Patented July 24, 1934

1,967,319

UNITED STATES PATENT OFFICE 1,967,319

TREATMENT OF FATS TO PRODUCE FATTY ACIDS

Jay R. Moore, Oakmont, and Earl K. Wallace, Pittsburgh, Pa.; said Wallace assignor to said Moore No Drawing. Application November 9, 1932, Serial No. 641,870

8 Claims. (Cl. 87—4)

This invention relates to the hydrolysis of fats with the formation of fatty acids and glycerol, and consists in a method of procedure which may be followed with great economy. The method is economical in (1) the matter of time, (2) expenditure of equipment and materials, and (3) quality of the products.

The fatty acids and glycerol are products of hydrolysis of fats and greases of various sources, some of them natural products and others by-products in the industrial arts. Several current methods are used. One consists in hydrolyzing the fat in the presence of a base (ordinarily calcium hydroxide) under pressure. Another more prevalent method effects hydrolysis by means of a catalyst, sulphuric acid, when the fat and water are emulsified. There are emulsifiers on the market for the very purpose of bringing the fat or grease into the desired dispersion in water (constituting an emulsion) that hydrolysis may be effected upon it. The current practice of hydrolysis is to treat the emulsion of fat, mineral acid, and water with live steam. The live-steam treatment is slowly effected. By way of example, thirty hours is the average time to bring about hydrolysis. The hydrolysis is completed in two operations. The first treatment effects about eighty-eight per cent. hydrolysis in eighteen or twenty hours. Then the fat and fatty acids are separated from the water layer. Fresh supplies of water and acid are added, and then the live-steam treatment is continued for twelve to fifteen hours more. The ultimate organic mix contains about ninety-five per cent. fatty acid.

We have discovered that, by bringing the fat, water, and a catalyst to the form of a true solution in a common solvent, hydrolysis may be effected in a shorter time, especially at an increased temperature. There are certain organic solvents, of which acetone is typical, with which water is miscible, and we have discovered that an acetone solution of fat (for example) will take water in sufficient quantity; and that, with the addition of an inorganic acid to serve as a catalyst, hydrolysis of the fat in such a solution may be effected. We have further perceived that, while the amount of water that may be added to the acetone solution of fat is relatively small (for if the permissible limit be exceeded the fat will correspondingly be precipitated), after an initial hydrolysis the remaining, unhydrolyzed, portion of the fat will not be precipitated, even though a greater quantity of water be added; and thus, following upon a second addition of water in larger quantity, a second hydrolyzing step may be taken and approximately complete hydrolyzation effected.

Typically, we proceed as follows: We dissolve 100 parts by weight of lard in 400 parts of acetone; to this we add 15 parts of water and two parts of sulphuric acid (which serves as a catalyst). The material, so compounded, is placed in an autoclave and subjected to heat externally applied. The temperature of reaction may range between 150° and 160° C., effecting an internal vapor pressure of about 200 pounds. Reaction under such conditions continues for 15 minutes, with hydrolyzation of about 75% of the fat.

In this typical procedure, as will be understood, the fat (in this case lard) will have undergone the usual preliminary treatment with sulphuric acid.

In heating in an autoclave, when the temperature has risen to a sufficient degree, any air within the autoclave may advantageously be driven off through a tap, being replaced by acetone vapor.

It will be understood of the foregoing figures, that they are illustrative; and that the essential operation may be performed under modified conditions. For instance, operating at atmospheric pressure, temperature is necessarily limited to the boiling point of acetone (58°–60° C.); and in such case, hydrolysis may be effected, though at much slower rate. Alternatively, if temperature be increased, above the figure given (pressure being necessarily increased), the rate of hydrolysis will be accelerated.

Alternatively, an otherwise identical composition may be prepared, with the addition of one part of the catalyst (sulphuric acid) instead of two; and in that case, the reaction being prolonged to as much as 30 minutes, about 50% of the fat will be hydrolyzed.

In either case, when the initial step has been performed, the heating may be intermitted and the acetone may be separated from the other components. This separation is conveniently effected by distillation. The remaining products are removed to a settling tank, and there, in the absence of acetone, the water, carrying in solution the glycerol product of hydrolysis, will settle to the bottom, whence it is drawn off. There remains in the settling tank the fatty-acid product of hydrolysis and so much of the original fat as has not yet undergone hydrolysis (in one case, 25%; in the other, 50%).

This remaining material is subjected to a similar second step. It is dissolved in acetone, in ratio, by weight, of 100 parts to 400; water is added—now in much greater quantity—in an amount as great as 100 parts; and again sulphuric acid is added, in quantity of two parts (alternatively, one part), to serve as a catalyst. The same conditions of hydrolysis are renewed, and after 1 hour, in case the sulphuric acid addition be as great as two parts (2 hours, if it be one part) a recovery will be found to have progressed to the hydrolyzation of more than 90% of the original fat. The quantity of water added in proceeding with such second step is conditioned by the percentage of fatty acid which has been produced in the first step. A greater amount than 100 parts is not forbidden, but 100 suffices.

As before, the acetone is driven off and the water, with glycerol in solution, is separated by decantation.

The alternative procedure indicated above, in which the smaller quantity of sulphuric acid is added, though requiring more time for its performance, has the advantage of affording a fatty acid of lighter and accordingly more desirable color.

The separation, on the completion of the first hydrolysis step, of the water with glycerol in solution is advantageous, particularly where an economical recovery of glycerol is desired.

Alternatively, on the completion of the first step, without separation of the acetone solvent, and without decantation, addition may be made of the second, larger quantity of water, and hydrolyzing conditions may then be renewed. After continued treatment for the period indicated above (1 hour, in case the sulphuric acid content be two parts; 2 hours, in case it be one part) the hydrolysis will be found to have progressed to equal degree (exceeding 90% of the original fat), and then the separations described my be effected.

The quantity of sulphuric added as a catalyst may be greater than that indicated above; the effect of excess is a darkening of the product (but a shortening of the time necessary for hydrolysis). Ordinarily two parts of acid suffice, but this quantity may be exceeded. If, however, as much as ten parts be employed, a tendency will appear to build up within the mixture undesirable reaction products.

Other catalysts, known to the chemist, may be employed. We have used with success (though for other reasons less desirably) hydrochloric acid.

The method of the invention is superior to any current method in that: (1) A shorter period of time is required for the complete operation; (2) The use of a smaller amount of water insures a higher concentration of glycerol. This, in turn, means a more economical glycerol recovery. (3) The light-colored product is commercially more desirable; and (4) The solvent, as acetone, can be economically recovered for repeated operations.

In the foregoing description the solvent employed is acetone. Other solvents are available, known to chemists, which have the power of dissolving and holding in solution fat, even in the presence of water. Among these are methyl ethyl ketone; diethyl ketone; that mixture of acetone (85%) and isopropanol (15%) known by the trade-name, Solvatone; another, ethylene glycol monoethyl ether (commonly called Cellosolve); and another is ethylene glycol monobutyl ether (commonly called butyl Cellosolve).

In the ensuing claims, we use the term "fat", and the term as here used will be understood to be inclusive of greases.

We claim as our invention:

1. The method herein described of hydrolyzing fat for the production of fatty acid and glycerol (either or both) which consists in dissolving the fat in a water-miscible solvent of a group which includes acetone, methyl ethyl ketone, diethyl ketone, a mixture of acetone and isopropanol, ethylene glycol monoethyl ether; and ethylene glycol monobutyl ether, adding water and an acid catalyst to the solution; subjecting the solution to hydrolyzing temperature; distilling off the solvent; and then by decantation separating the water, with the glycerol product of hydrolysis in solution, from the residue.

2. The method herein described of hydrolyzing fat for the production of fatty acid and glycerol (either or both) which consists in dissolving the fat in acetone; adding water and sulphuric acid to the solution; subjecting the solution to hydrolyzing temperature; distilling off the acetone; and then by decantation separating the water, with the glycerol product of hydrolysis in solution, from the residue.

3. The method herein described of hydrolyzing fat for the production of fatty acid and glycerol (either or both) which consists in dissolving the fat in acetone; adding water and hydrochloric acid to the solution; subjecting the solution to hydrolyzing temperature; distilling off the acetone; and then by decantation separating the water, with the glycerol product of hydrolysis in solution, from the residue.

4. The method herein described of hydrolyzing fat for the production of fatty acid and glycerol (either or both) which consists in dissolving the fat together with water and an inorganic acid as a catalyst in a common solvent of a group that consists of acetone, methyl-ethyl ketone, diethyl ketone, isopropanol, ethylene glycol monoethyl ether, and ethylene glycol, monobutyl ether; effecting hydrolysis of a portion of the fat by subjecting the solution to hydrolyzing temperature; then adding more water, and effecting hydrolysis of substantially the remainder of the fat by subjecting the material a second time to hydrolyzing temperature; distilling off the solvent; and then by decantation separating the water, with the glycerol product of hydrolysis in solution, from the fatty-acid product of hydrolysis.

5. The method herein described of hydrolyzing fat for the production of fatty acid and glycerol, which consists in dissolving the fat together with water and an inorganic acid as a catalyst in a common solvent of a group that consists of acetone, methyl-ethyl ketone, diethyl ketone, isopropanol, ethylene glycol monoethyl ether, and ethylene glycol monobutyl ether, effecting hydrolysis of a portion of the fat by subjecting the solution to hydrolyzing temperature, then removing the initial solvent, decanting the fatty acid produced together with the still unresolved fat from the aqueous solution of glycerol, redissolving the fatty acid and fat together with fresh supplies of water and catalyst in a common solvent, and effecting hydrolysis of substantially the remaining portion of the fat by subjecting such second solution to hydrolyzing temperature.

6. The method herein described of producing fatty acid which consists in dissolving fat in acetone, in substantially the ratio by weight of 100 parts of fat to 400 parts of acetone, adding to the solution 15 parts of water, together with sulphuric acid; subjecting the whole to hydrolyzing temperature, then adding water in larger quantity, restoring the condition of hydrolyzing temperature and maintaining it for a further period; then removing the acetone by distillation and the aqueous solution of glycerol by decantation, from the fatty acid so produced.

7. The method herein described of producing glycerol which consists in dissolving fat in acetone, in substantially the ratio by weight of 100 parts of fat to 400 parts of acetone, adding to the solution 15 parts of water, together with a catalyst; subjecting the whole to hydrolyzing temperature; distilling off the acetone; and then by decantation separating the produced glycerol in aqueous solution from the residue.

8. The method herein described of producing fatty acid and glycerol from fat which consists in dissolving the fat in acetone substantially in the ratio by weight of 100 parts of fat to 400 parts of acetone; adding 15 parts of water, together with sulphuric acid; hydrolyzing a part of the fat by subjecting the whole to hydrolyzing temperature; then removing the acetone and decanting the derived fatty acid together with the still unresolved fat from an aqueous solution of the derived glycerol; dissolving the fat and fatty acid again in acetone, in substantially the ratio by weight of 100 parts of fat and fatty acid to 400 parts of acetone; adding water in larger quantity, together with sulphuric acid; submitting this second solution to hydrolyzing temperature; then again removing the acetone; and separating by decantation the fatty acid from an aqueous solution of glycerol.

JAY R. MOORE.
EARL K. WALLACE.